US008819476B2

(12) United States Patent
Roth et al.

(10) Patent No.: US 8,819,476 B2
(45) Date of Patent: Aug. 26, 2014

(54) SYSTEM AND METHOD FOR DISASTER RECOVERY

(75) Inventors: Todd Stuart Roth, Shadow Hills, CA (US); Stanley Robert Moote, Toronto (CA)

(73) Assignee: Imagine Communications Corp., Englewood, CO (US)

( * ) Notice: Subject to any disclaimer, the term of this patent is extended or adjusted under 35 U.S.C. 154(b) by 374 days.

(21) Appl. No.: 13/245,317

(22) Filed: Sep. 26, 2011

(65) Prior Publication Data

US 2013/0080823 A1    Mar. 28, 2013

(51) Int. Cl.
*G06F 11/16* (2006.01)

(52) U.S. Cl.
USPC ............ 714/1; 714/2; 714/4.11; 714/6.3; 714/13

(58) Field of Classification Search
USPC .................................. 714/4.11, 13
See application file for complete search history.

(56) References Cited

U.S. PATENT DOCUMENTS

| 7,159,234 | B1 | 1/2007 | Murphy et al. | |
|---|---|---|---|---|
| 7,289,493 | B1 * | 10/2007 | Vera | 370/356 |
| 7,318,107 | B1 | 1/2008 | Menon | |
| 2001/0000194 | A1 * | 4/2001 | Sequeira | 725/39 |
| 2006/0265489 | A1 | 11/2006 | Moore | |
| 2007/0136200 | A1 * | 6/2007 | Frank et al. | 705/50 |
| 2008/0256384 | A1 | 10/2008 | Branson et al. | |
| 2009/0263100 | A1 * | 10/2009 | Neuman | 386/52 |
| 2010/0228819 | A1 | 9/2010 | Wei | |
| 2011/0083037 | A1 * | 4/2011 | Bocharov et al. | 714/4.11 |
| 2011/0085440 | A1 * | 4/2011 | Owens et al. | 370/216 |
| 2011/0225095 | A1 | 9/2011 | Gawali | |
| 2011/0231888 | A1 * | 9/2011 | Sequeira | 725/116 |
| 2011/0283011 | A1 * | 11/2011 | Li et al. | 709/231 |
| 2011/0302412 | A1 * | 12/2011 | Deng et al. | 713/159 |
| 2012/0099022 | A1 * | 4/2012 | Sundy et al. | 348/705 |
| 2012/0117422 | A1 * | 5/2012 | Radhakrishnan | 714/15 |
| 2012/0179742 | A1 * | 7/2012 | Acharya et al. | 709/202 |
| 2012/0254269 | A1 * | 10/2012 | Carmichael | 707/827 |
| 2012/0316882 | A1 * | 12/2012 | Fiumi | 704/270 |

* cited by examiner

*Primary Examiner* — Chae Ko
(74) *Attorney, Agent, or Firm* — Tarolli, Sundheim, Covell & Tummino LLP (57) ABSTRACT

A disaster recovery system can include a plurality of resources arranged in a cloud computing environment. Each of the resources can be assignable to function within the cloud computing environment as part of one or more media systems. A content intake service can be programmed to control delivery of an incoming media asset to the cloud computing environment. A monitoring and recovery process can be programmed to monitor a primary media system to which the incoming media asset is being provided and, in response to detecting a disaster recovery condition, the monitoring and recovery process can intelligently manage selected resources of the plurality of resources based on the incoming media asset being delivered to the primary media system.

23 Claims, 4 Drawing Sheets

SYSTEM AND METHOD FOR DISASTER RECOVERY

TECHNICAL FIELD

The present invention relates generally to business continuity and, more particularly, to a system and method for disaster recovery.

BACKGROUND

Disaster recovery can include the process, policies and procedures related to preparing for recovery or continuation of technology infrastructure critical to an organization, such as after a natural or human-induced disaster. In the broadcast and other industries where continuity of operations is important, N+1 redundancy is sometimes utilized to provide a backup for a given component. The backup component can operate in a standby mode, which can be an active or passive condition until a given component fails. While such redundancy can operate satisfactorily for isolated failure of individual resources, it can become complicated in disaster conditions, such as if multiple resources of a workflow (e.g., a digital media supply chain) process fail.

SUMMARY

This disclosure relates generally to a system and method for disaster recovery, such as for broadcast media assets.

In one example, a disaster recovery system can include a plurality of resources arranged in a cloud computing environment. Each of the resources can be assignable to function within the cloud computing environment as part of one or more media systems. A content intake service can be programmed to control delivery of an incoming media asset to the cloud computing environment. A monitoring and recovery process can be programmed to monitor a primary media system to which the incoming media asset is being provided and, in response to detecting a disaster recovery condition, the monitoring and recovery process can intelligently manage selected resources of the plurality of resources based on the incoming media asset being delivered to the primary media system.

As another example, a method of providing a disaster recovery service for broadcast media providers can be provided. The method can include detecting a disaster recovery condition within a media supply chain of a respective media provider. Resources in a cloud computing environment (e.g., virtual resources for a media supply chain) can be prepared for switchover to corresponding operations in the media supply chain based on a definition of an incoming real-time media asset to the respective media provider. In response to receiving a trigger, the operations in the media supply chain of the respective media provider can be switched over to the allocated resources in the cloud computing environment to provide disaster recovery media operations for the respective media provider.

DETAILED DESCRIPTION

The invention relates generally to a system and method for disaster recovery. The system can be implemented as a service in a cloud computing system that employs a plurality of cloud resources, including cloud storage resources for storing media assets and non-storage resources referred to herein as media resources. The media resources can include any cloud computing resources (e.g., hardware and/or software) that may operate in a digital media supply chain. In the cloud computing environment, media resources can be thin-provisioned and intelligently allocated to client media systems in response to detecting one or more failing resources corresponding to a disaster recovery condition. Since multiple, simultaneous geographically dispersed disasters are extremely improbable, thin provisioning of media resources within the cloud can permit a single physical resource to be sold to multiple clients in the same or different geographic locations.

The media resources can be intelligently allocated based on understanding the media asset, such as can be determined from the asset's metadata. For example, rules can be selected for a given media asset based on understanding the type of media asset which can be ascertained from associated metadata for the given media asset. Additionally, incoming media assets can be modified, such as being transcoded to a reduced data rate, for data recovery. The modified asset can be delivered into the cloud for storage in provisioned memory resources or for real-time playout. The cloud storage resources can be fully provisioned to store media assets for subscribers according to each subscriber's level of service.

As will be appreciated by those skilled in the art, portions of the invention may be embodied as a method, data processing system, or computer program product. Accordingly, these portions of the present invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable computer-readable medium may be utilized including static and dynamic storage devices, hard disks, optical storage devices, and magnetic storage devices.

Certain embodiments of the invention are described herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 1:
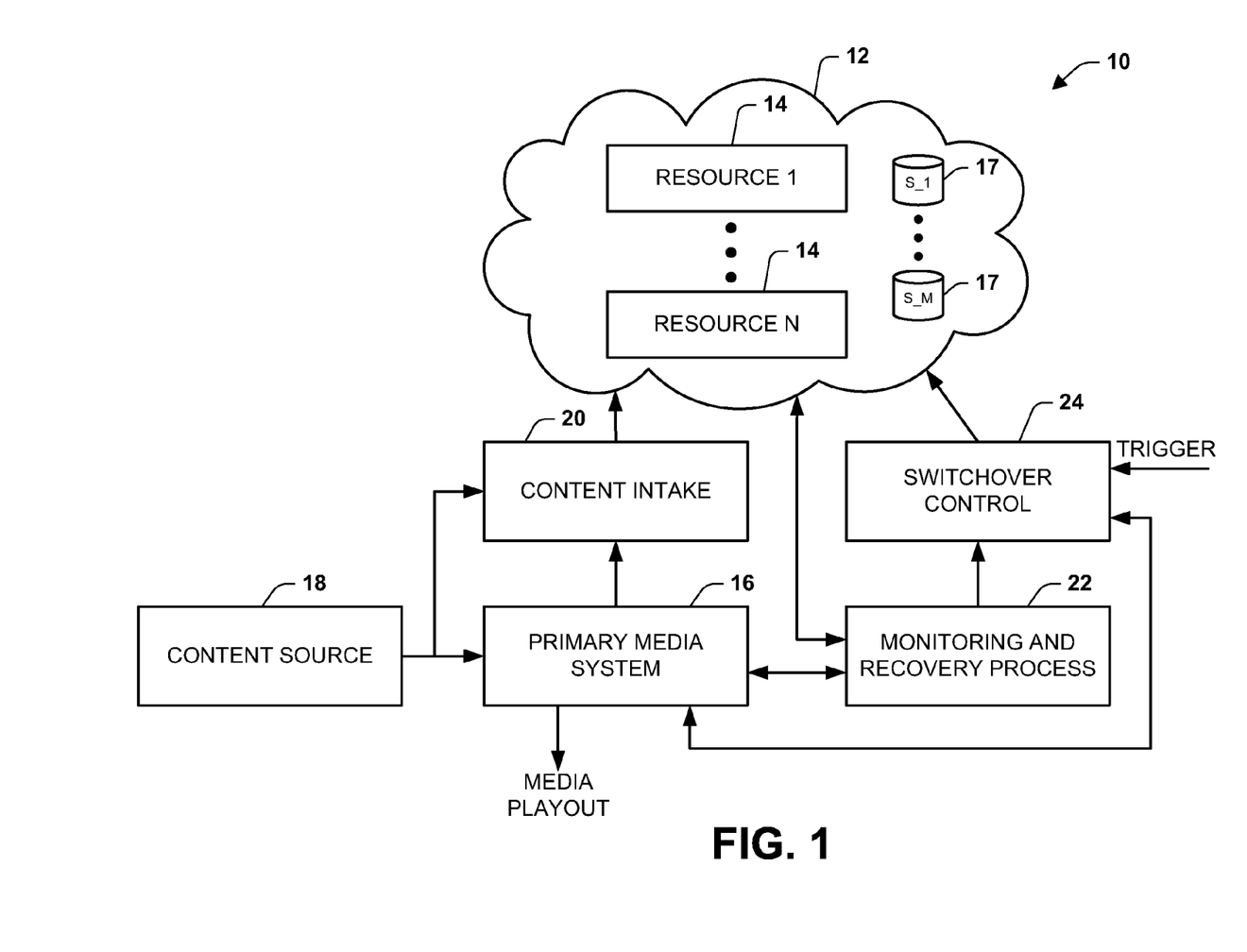
FIG. 1 depicts an example of a disaster recovery system according to an embodiment.

Turning to FIG. 1, an example disaster recovery system 10 is implemented in a cloud computing environment, also referred to herein as a cloud 12. A plurality of media resources 14 are implemented within the cloud 12, demonstrated as Resource 1 through Resource N, where N is a positive integer. The resources 14 can include software, hardware, or a combination of hardware and software configured to implement real-time broadcast operations, such as any or all operations implemented as part of a digital media supply chain of a primary media system 16. As used herein, the term "primary media system" refers to a set of active (and possibly some backup) resources configured to operate as one or more parts of a digital media supply chain for a given media provider (e.g., from production through transmission). Thus, by way of example, the media resources 14 can include an uplink, downlink, traffic and billing system, ad insertion, digital asset management system, media delivery, playout automation, contingency (e.g., backup) media assets, and the like. The cloud 12 also includes cloud storage resources 17, demonstrated as S_1 through S_M, where M is a positive integer referring to the amount of resources, to store media for any number of one or more such media systems 16.

As a further example, some of the media resources 14 can be provisioned as to remain active during normal operations of the primary media system 16 to facilitate switchover to the cloud resources 14 in the event of a disaster recovery condition. Alternatively, resources can be provisioned to operate in a standby mode and activated in response to the monitoring and recovery process 22 detecting the disaster recovery condition.

During normal (e.g., non-disaster) operating conditions, one or more content sources 18 can feed media assets to the primary media system 16, such as via terrestrial link (e.g., optical fiber) or wireless link (e.g., satellite). The source and location for a given media asset can be identified by resources implemented as part of the primary media system 16, such as a digital asset management system and an automation system (not shown). The primary media system 16 can provide corresponding media playout of the media asset according to the scheduling and automation for such asset. The particular path and processing of the media asset will vary depending on the workflow and digital media supply chain implemented by the primary media system 16.

The media asset can also be fed to a content intake module 20. The feed can be the same as that used to provide the asset to the primary media system 16 or, alternatively, a different feed can be utilized. The content intake module 20 can obtain feed location data from corresponding resources of the primary media system 16, such as via application interfaces to the digital asset management system. The content intake module 20 delivers the media asset to cloud 12 in real time, which depending on the type of asset may be stored in cloud storage resources 17 for time-shifted playback or be made available for real-time playout. The content intake module 20 thus feeds the cloud storage resources 17 continuously in real time. The total pool of available storage resources 17 can be provisioned to each respective media provider 16 according to storage requirements (e.g., defined by a subscription level). For example, the intake module 20 can control allocation of storage resources 17 for each provider 16 for storage of media assets for contingency operations. The intake module 20 can also release allocated resources back to the pool after expiration of the stored content (e.g., after playout or based on time of storage).

The content intake module 20 can also modify the data assets to a different state and store the modified data in the allocated storage resource 17. For example, the content intake module 20 can be configured to transcode the media content of the asset to a reduced disaster recovery data rate. The reduced disaster recovery data rate can reduce the cloud storage resource requirement and facilitate the thin provisioning of the resources 14 in the cloud 12.

As a further example, thin provisioning of the media resources 14 can be implemented to ensure, to a statistically sufficient level (e.g., two standard deviations of an expected utilization level), that adequate resources will remain available for the subscribing media providers. This can be done by virtualizing a set of resources in the cloud 12 for each of the subscribing media providers (i.e., there can be a plurality of different primary media systems 16). In this way, each subscribing media provider will be provisioned virtual resources in the cloud 12 sufficient to enable disaster recovery for each aspect of its media supply chain, although the on-demand allocation of the actual physical resources during disaster recovery conditions may be shared among a plurality of subscribing providers.

A monitoring and recovery process 22 can be programmed to monitor operations of primary media system 16 and detect the occurrence of a disaster recovery condition. The disaster recovery condition can correspond to a failure of one or more resources within the primary media system 16 such as due to a natural or human-induced disaster. The failure can result in an immediate cessation of real time broadcast operations including media playout. Alternatively, the failure may occur upstream in the workflow as to prevent subsequent time-shifted media playout from the primary media system. In an example where multiple resources fail in a disaster recovery condition, the resources can correspond to contiguous or spaced apart resources in the workflow of its supply chain.

In response to detecting the disaster recovery condition, the monitoring and recovery process 22 can also intelligently manage selected cloud computing resources 14 based on the incoming media asset that is being delivered to the primary media system 16. The intelligent management can include preparing and allocating corresponding media resources 14 sufficient to maintain real-time broadcast operations for the primary media system 16. This can include mapping of physical resources such as can be implemented as nodes within the cloud 12. This can also include instantiating software applications and re-directing workflows to employ the resources 14 within the cloud 12. The resources 14 utilized for a given disaster recovery condition can correspond to resources for an entire media supply chain or to a portion thereof. As one example, the monitoring and recovery process 22 can allocate the automation function and asset management function of a media supply chain. When cloud computing resources 14 have been allocated to a given media system, the allocated resources are dedicated to disaster recovery process for the given media system for providing deterministic performance.

The system 10 can also include a switchover control 24 that is programmed to connect (e.g., activate) the allocated resources 14 into real-time operations in the media supply chain of the primary media system 16. In one example, the switchover control can implement the switchover in response to a trigger. The trigger can be provided in response to a user input, such as by an authorized user (e.g., a supervisor), manually confirming that the switchover should proceed. As an alternative example, confirmatory rules and/or other automated methods can be implemented to confirm the existence of an actual disaster recovery condition.

Thus in response to the trigger, the switchover control 24 can execute the switchover to the resources 14 that have been allocated via the monitoring and recovery process 22. The switchover control 24 can employ the allocated resources 14 to replace the failed portion of the primary media system 16. For example, the allocated resources 14 can be mapped as nodes within the cloud (e.g., via uniform resource locators (URLs)) and associated methods and functions thereof can be accessed via corresponding APIs. Functional resources within the primary media system can be instructed to employ the selected resources in the cloud and cloud resources likewise can be instructed to communicate with operations in the primary media system that have not failed. With the media supply chain restored via the use of cloud resources, real time media workflow operations can continue. After appropriate repairs to the primary media system 16 have been made, the switchover control 20 can release the resources 14 back into the cloud 12 such that the resources are available for other disaster recovery operations.

Figure 2:
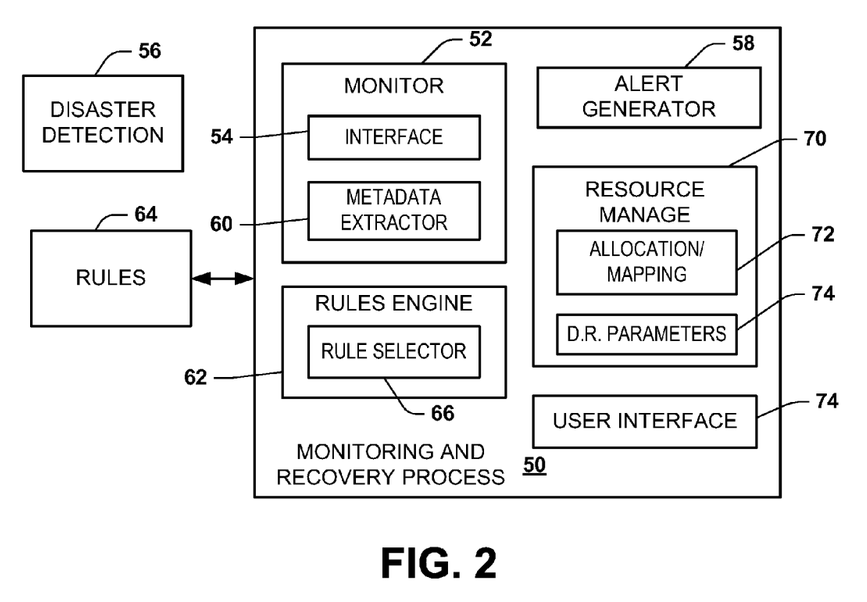
FIG. 2 depicts an example of a monitoring and recovery process that can be implemented in a disaster recovery system according to an embodiment.

FIG. 2 depicts an example of a monitoring and recovery process 50 that can be implemented in a disaster recovery system (e.g., the system 10 of FIG. 1). The monitoring and recovery process 50 can include a monitor function 52 programmed to monitor operations of a primary media system and to detect a disaster recovery condition. The monitoring and recovery process 50 can be in communication with the primary media system through a network, such as a local area network or wide area network (e.g., the Internet) and/or directly via direct connection.

The monitor function 52 can include one or more interfaces 54 to access and retrieve information at various points of the media supply chain that forms the primary media system. For example, the interface 54 can include an API programmed to retrieve operating parameters (e.g., diagnostic information) for each application program running in the primary media system that could, upon failure, compromise playout of media assets. The operating parameters could be retrieved continuously or periodically and stored in local memory. In certain types of failures corresponding to disaster conditions, the interface may be unable to obtain the any operating parameters from one or more points in the media supply chain. The inability of the interface 54 to receive operating information or otherwise access operations (e.g., due to absence of responding by such operations) in the media supply chain, can also be stored in local memory for evaluation by the monitoring and recovery process 50.

The monitoring and recovery process 50 also includes a disaster detector 56 programmed to detect the occurrence of disaster recovery condition based on the operating parameters obtained by the monitor 52. The disaster detector 56, for example, can employ disaster metrics programmed to aggregate operating parameter information obtained for the primary media system operations and determine if a disaster recovery condition exists.

As an example, the disaster detector 56 can compare the retrieved operating parameters to preprogrammed expected (e.g., normal) operating parameters. The disaster detector 56 can employ the predetermined metrics to evaluate the retrieved parameters to ensure that any detected failure is sufficiently severe to require disaster recovery. This can include the absence of retrieving operating parameters from mission critical points in the media supply chain for at least a predetermined period of time. For instance, if an interface becomes unable to obtain operating parameters for business operations and/or media that have been historically available, the disaster detector 56 can infer a failure for such business operations. Alternatively or additionally, a given operation in the media supply chain may itself be functional, but has not received its expected instructions or media assets from another part of the supply chain. An intermittent failure of one or more operations in the supply chain likely does not correspond to a disaster condition. Accordingly, the disaster metrics can also analyze whether the retrieved operating parameters have been outside the expected operating parameters for at least a predetermined period of time. Thus, the disaster detector 56 can evaluate the operating parameters over time to ascertain whether a disaster recovery condition should exist.

An alert generator 58 can be programmed to provide one or more alerts in response to the determining (e.g., by the disaster detector 56) the occurrence of a disaster recovery condition. In one example, the alert can be sent to one or more pre-identified individuals using a messaging system (e.g., email, text message, telephone call or the like). In another example, the alert notification can require a response from one or more authorized persons, such as in the form of user input, to enable disaster recovery services to perform a switchover to corresponding cloud resources. The response can be implemented in many ways. As an example, the alert generator 58 can send an alert message to the authorized user(s) via email or other messaging technology. In addition to supplying a description of one or more failures (e.g., derived from the operations information retrieved by the monitor 52), the message can include a link to an authorization form to confirm whether switchover to the disaster recovery cloud should occur. In some examples, the authorized user may also be able configure or confirm parameters for controlling one or more cloud based resources that may be implemented as part of the disaster recovery operations. A user can also choose to prevent disaster recovery from being implemented. The response (e.g., to authorize or prevent disaster recovery) can be stored in memory as part of a disaster recovery record.

The monitoring and recovery process 50 can also include a metadata extractor 60 programmed to obtain selected metadata from an incoming media asset. The selected metadata can correspond to one or more selected metadata fields that describe the type of asset. The metadata can be obtained directly from an incoming the media asset or it can be obtained from another operation in the media supply chain, such as from digital asset management, traffic, automation, and content distribution systems.

In one example, the interface 54 can be programmed to enable the metadata extractor 60 to obtain sufficient metadata for the media asset such that an asset definition can be generated for each incoming asset. The number of possible asset definitions for media assets can vary depending on the extent of metadata that is acquired for a given media asset as well as the number and types of metadata obtained by the metadata extractor 60. The methods utilized to obtain the metadata can vary depending on the format of metadata, which may involve a standard protocol or a proprietary protocol. As one example, for broadcast media assets, metadata can be provided according to the broadcast exchange format (BXF), although other standard or proprietary metadata formats can be utilized. It is to be appreciated that a richer set of metadata associated with a given asset (e.g., a piece of media content or material) can afford the opportunity for a richer, more precise asset definition, which can further enable additional and more specialized services (e.g., ad insertion, contingent asset selection) to be implemented by resources within the disaster recovery cloud service.

The monitoring and recovery process can employ a rules engine 62 to intelligently control the disaster recovery process. For example, the rules engine 62 can employ different rules 64 manage disaster recovery operations depending on the type of incoming media assets. The type of asset can be implemented as an asset definition, such as can be generated from the extracted metadata. Some examples of metadata fields that can be queried to create an asset definition for a given asset include TYPE, SUB-TYPE, and PROGRAM CATEGORY to name a few. The asset definition can include a description from the metadata fields or the descriptions can be aggregated and a corresponding asset definition value be provided for each incoming asset.

As an example, an asset definition can differentiate media assets according to whether it is a live event, a time-shifted event, it is a daily program, whether it is syndicated, it is a promotional event. In addition to identifying a media asset as an ad, the definition can further specify whether it is a local, regional or national ad. Thus, a richer set of extracted metadata can allow a more expansive set of asset of definitions, which can afford a finer granularity of control for disaster recovery operations. The number and types of asset definitions can be user programmable via a user interface 74, for example.

A rule selector 66 can be programmed to select a set of appropriate rules 64 based on the asset definition. The rule set can be used to control preparation and allocation of resources for disaster recovery operations. For example, the rule selector 66 can select different rules to accommodate different types of assets differently. By selecting rules based on understanding real-time media assets, for example, rules can be implemented mitigate the effects of disaster recovery on end users and advertisers. As a further example, if feeds for an incoming live event fail during a disaster recovery condition, rules can be implemented to select contingent back-up content specific for that event. Similarly, if the feed for an incoming syndicated situational comedy program were lost, the rules engine can employ rules to select, for example, a different episode of the same different program or a different program but similar genre—depending on availability. Thin provisioning of the resources in the cloud can be become more intelligent because the rules engine applies rules differently depending on the type of incoming media assets.

Depending on the asset definition and the extent of the failure, the rules engine 62 can also identify the location of a contingent media asset. This may include a location for an asset that already has been loaded into cloud storage or an asset that can be obtained via an available feed and delivered to the cloud in real-time. As disclosed herein, actual switchover of operations to the allocated cloud resources may require a separate trigger (e.g., a user input or an automated trigger).

The monitoring and recovery process 50 can also employ a resource manager 70 to manage resources for a disaster recovery condition. The resource manager 70 can manage the resources based on the rules being applied, which can vary depending on the asset definition of incoming real-time media assets as disclosed herein. As an example, the resource manager 70 can include an allocation/mapping function 72 programmed to initiate the preparation and allocation of resources in the cloud in response to detecting a disaster recovery condition (e.g., by the disaster detector 56). This can include allocating and/or instantiating media resources from the cloud and dedicating such resources to an impending disaster recovery process for a respective media provider. The preparation and allocation can also include physical mapping of already provisioned virtual resources to physical resources (e.g., nodes) within the cloud as well as programmatically via corresponding APIs to access corresponding software resources for continuing failed operations in the media supply chain. For instance, the resource manager 70 can employ a mapping table to control provisioning of the virtual resources in the cloud for each the subscribing media systems. Once the resource manager allocates and instantiates resources for a detected disaster recovery condition for a given media provider, the previously virtually-provisioned resources become deterministic for performing specific operations for the given media provider. That is, prior to such allocation, media resources are available to any subscribing media provider such that the future state of the resources can be considered somewhat random.

The resource manager 70 can also be programmed to control other operations associated with the resources in the cloud. For example, the user interface 74 can access a configuration function to program disaster recovery control parameters 76. The parameters can permit configuring available services for a client media system according to a level of disaster recovery service purchased by the client media system. The parameters 76 can control the duration and data rate of media assets that can be stored in the cloud service for each channel. The level of service can also be utilized to determine a priority of resources for different client media systems, which can further facilitate thin provisioning of the resources in the cloud. While the resource manager 70 is demonstrated within the monitoring and recovery process 50, it will be appreciated that the resource manager could be implemented as one or more separate methods that can be accessed by the monitoring and recovery process via a corresponding API.

For purposes of simplification of explanation, different components of the monitoring and recovery process 50 are illustrated and described as performing different functions. However, one of ordinary skill in the art will understand and appreciate that the functions of the described components can be performed by different components, and the functionality of several components can be combined and executed on a single component. The components can be implemented, for example, as software (e.g., computer executable instructions), hardware (e.g., an application specific integrated circuit or device), or as a combination of both. In other examples, the components could be distributed among remote devices across the cloud (e.g., as corresponding functions of the disaster recovery service).

Figure 3:
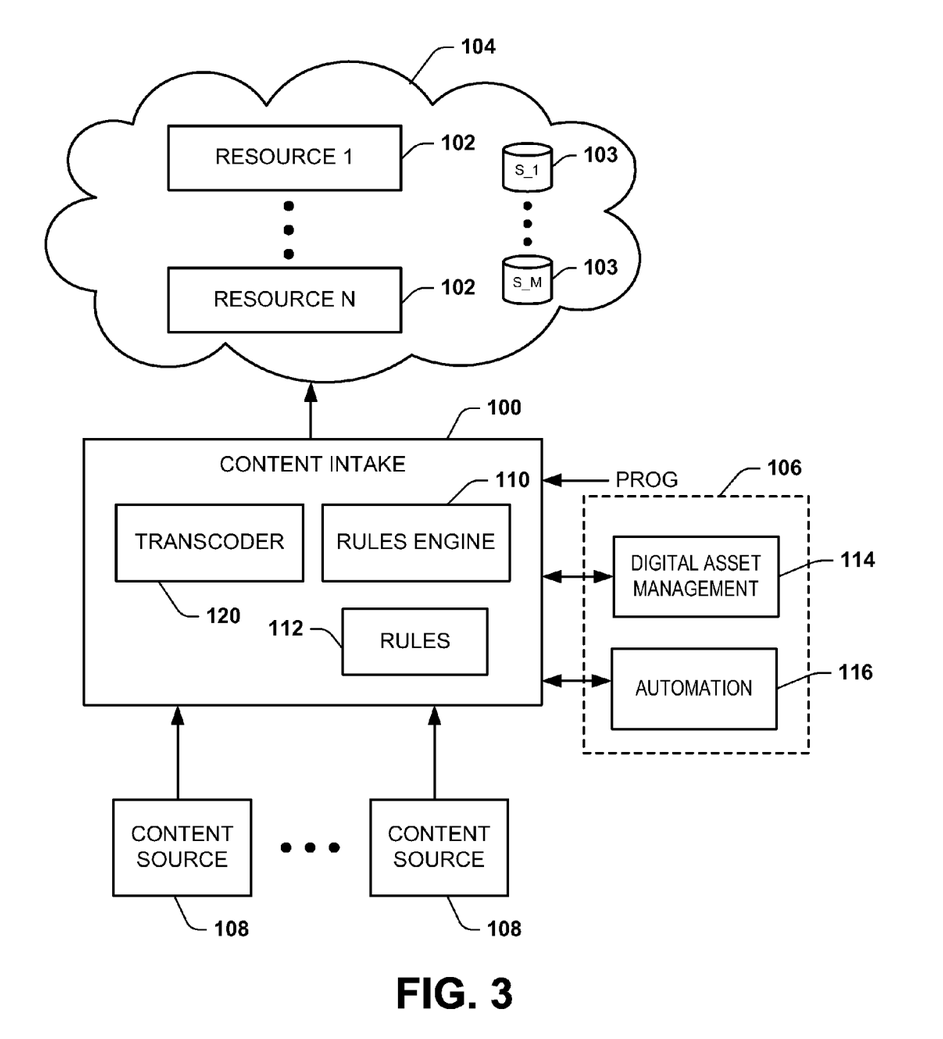
FIG. 3 depicts an example a content intake process that can be utilized for a disaster recovery system according to an embodiment.

FIG. 3 demonstrates an example of a content intake service 100 that can be utilized to deliver real-time media assets to selected media resources 102 and storage resource 103 in a cloud 104. The content intake service 100 can be programmed to mirror incoming real-time media assets that are fed to a corresponding primary media system, schematically demonstrated at 106, from one or more content sources 108. For example, the content sources 108 can provide content via terrestrial or wireless communication links. The content sources 108 typically provide the media content in the assets in a highest available data rate.

The content intake service 100 can include a rules engine 110 that employs rules 112 to control the intake process. The rules 112 can include a set of business rules that can vary depending on the terms of a subscription service for each subscribing media system 106. The rules 112 can be programmed (e.g., via a user interface—not shown) to control parameters for content intake including the duration (e.g., an amount of hours) of content that is stored in a given storage resource 103 allocated to the subscribing media system 106. The rules 112 may also control delivery of certain types of assets (e.g., live media) directly to a media resources 102 allocated for a given media provider, for example, during a disaster recovery process for the given media provider.

The rules engine 110 can employ the rules 112 to control automatic removal of content from the cloud 104. For example, the rules engine 110 can automatically remove content from cloud storage 103 in the cloud 104 after expiration of content. In order to determine whether to content has expired (e.g., it has been played out at the primary media system), the rules engine 110 can obtain information from one or more points in the supply chain of the subscribing media system 106 (e.g., via one or more APIs), such as from a digital asset management system 114 and an automation system 116. The rules engine 110 can also automatically remove content from cloud storage 103 based on rules that establish the amount of hours that content is stored. The rules engine 110 may also employ operations information obtained from the subscribing media system 106 to locate corresponding media assets for intake based on rules tied to the client's subscription level. The rules 112 can also be programmed to identify a priority between different content sources 108, such that if a given media asset is not available from one source, the rules engine 110 can instruct the intake service to obtain such asset from an alternative source.

The content intake service 100 can also modify the asset to a different form to facilitate efficient storage in the cloud storage resources 103. As an example, the content intake service 100 can include a transcoder 120 to transcode the incoming media asset to a corresponding disaster recovery asset, such as having a reduced bit rate relative to the original asset received from the content source 108. The disaster recovery bit rate for a given asset further can be defined by the rules 112, such as may vary depending on a subscription service level of the subscribing provider. This is in contrast to other approaches in which the backup content tends to be identical to that provided to the subscribing media system 106.

Figure 4:
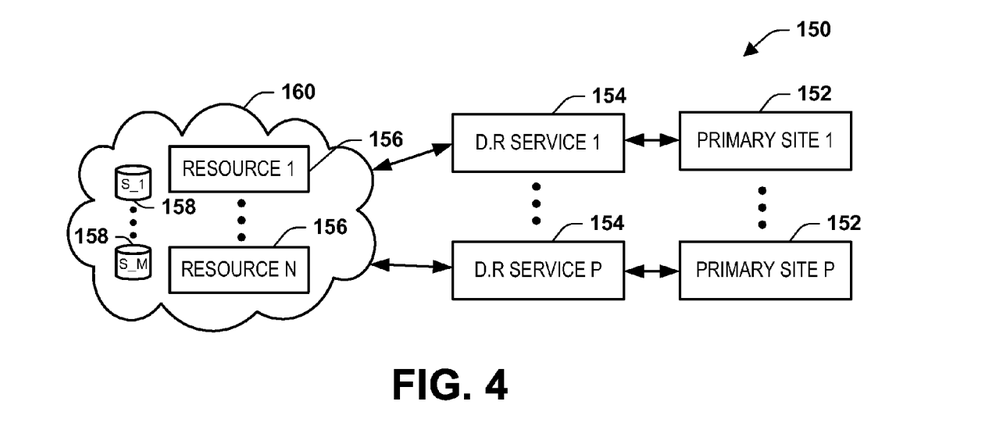
FIG. 4 depicts another example of a disaster recovery system according to an embodiment.

FIG. 4 depicts an example of a disaster recovery system 150 demonstrating that the systems and methods disclosed herein (e.g., including FIGS. 1-3 and 5) are intended to support multiple media systems. In this example, the system shows a plurality of primary sites 152, demonstrated as primary site 1 through primary site P, where P is a positive integer denoting the number of sites. Each site 152 can include a corresponding media supply chain that implements various hardware and software components configured to playout media, such as can include real-time broadcast of video, audio, digital signage or the like over physical and/or wireless technologies. It will be understood that some of the hardware and software components can be shared among different sites if part of a common enterprise system. In this example each site subscribes to and implements a corresponding disaster recovery service 154, demonstrated as D.R. service 1 through D.R. service P.

Each of the disaster recovery services 154 is programmed to employ a set of media resources 156, demonstrated as resource 1 through resource N, where N is a positive integer, and storage resources 158 that are implemented in a cloud 160, such as disclosed herein. While the disaster recovery services 154 are demonstrated as outside the cloud 160, it will be appreciated that such services can be consider part of the cloud. As disclosed herein, the disaster recovery services 154 can detect a disaster recovery condition for a respective media site 152 as well as the process of switching operations to employ the media resources 156 and storage resources 158. As a further example, a billing model for the subscription service can include an ongoing charge for the subscription service plus a usage fee depending on the usage of the resources to provide disaster recovery for media operations. Other billing arrangements are possible.

Figure 5:
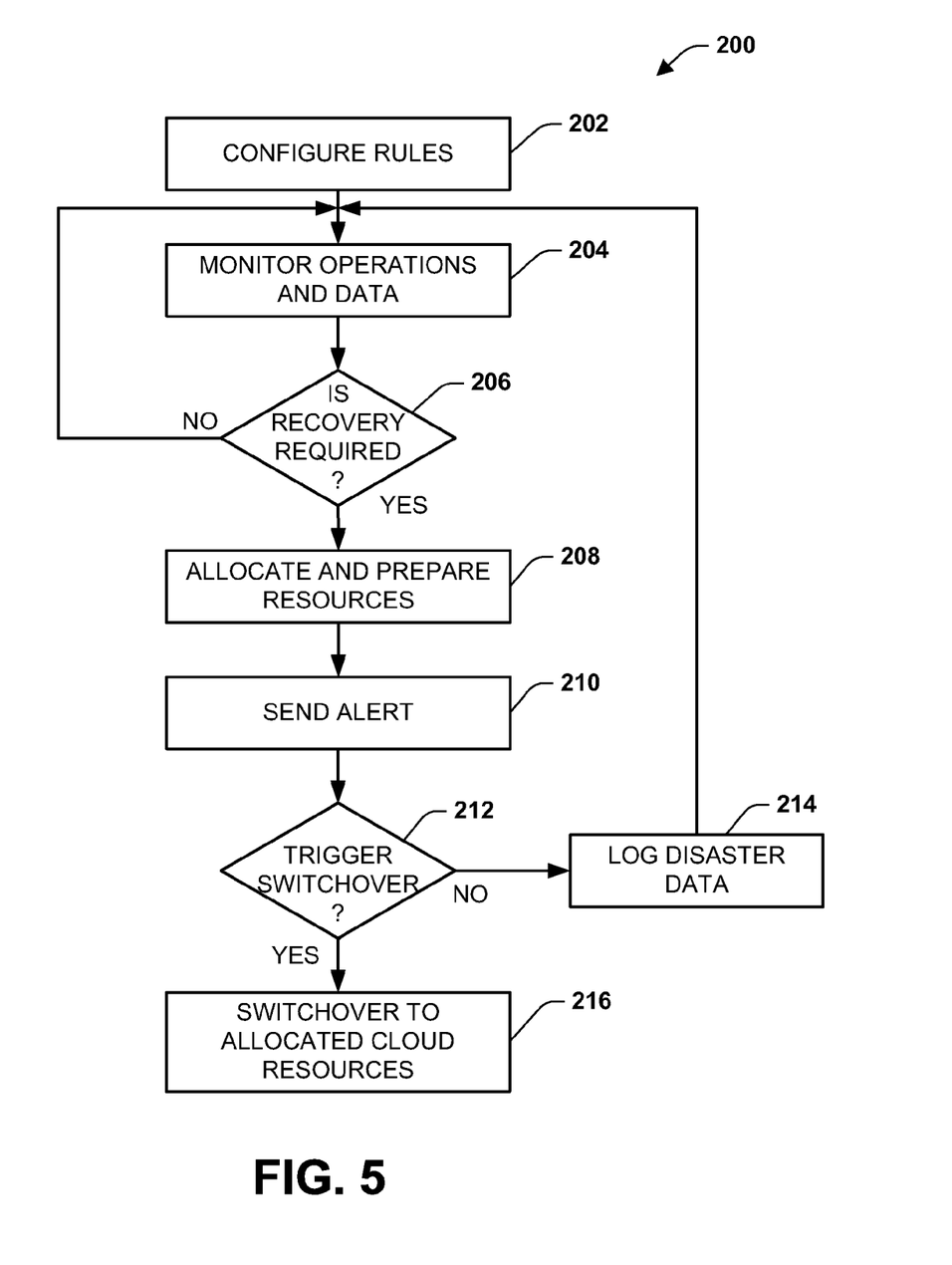
FIG. 5 is a flow diagram demonstrating an example method of disaster recovery that can be performed according to an embodiment.

In view of the structural and functional features described above, certain methods will be better appreciated with reference to an example method 200 depicted in FIG. 5. It is to be understood and appreciated that the illustrated actions, in other embodiments, may occur in different orders or concurrently with other actions. Moreover, not all features illustrated in FIG. 5 may be required to implement a method.

FIG. 5 depicts an example of a method for implementing automated disaster recovery using cloud-based resources. The method 200 can be implemented to provide disaster recovery protection for any number of primary media systems, such as disclosed herein. The method 200 begins at 202 in which rules and other disaster recovery parameters are configured. This rules and parameters can establish a level of disaster recovery service, for example, based on a subscription service level for a respective primary media system. For instance, cloud storage can be allocated for storing media content for each subscribing media system and thin-provisioned media resources can be virtually allocated.

Once the rules and disaster recovery parameters have been set, the method proceeds to 204. At 204, operations and data can be monitored. The operations can correspond to any operations information and data within a media supply chain for the subscribing media system. For instance one or more interfaces (e.g., interface 54 of FIG. 1) can be employed to obtain the operations information and data.

At 206, a determination is made whether disaster recovery is required. This determination can be made (e.g., by disaster detector 56 of FIG. 1) based on the monitored operations and data that can be collected and stored over time. If disaster recovery is not warranted, the method can return to 204 and continue the monitoring process. If it is determined that disaster recovery seems appropriate, the method can proceed to 208. At 208, the media resources in the can be allocated and prepared for switchover (e.g., by resource manager 70 of FIG. 1). This can include mapping cloud resources with corresponding points in the media supply chain as well as accessing rules to control flow of media assets for the disaster recovery condition. The allocation of resources and preparation for switchover can also be controlled based on metadata that describes the type of incoming media asset. At 210, an alert can be sent (e.g., via alert generator 58 of FIG. 1) to one or more predetermined recipient, which can include users and/or applications. The alert can provide an informational notice as well as require a response or other action by the recipient.

At 212 a determination can be made whether to trigger switchover to disaster recovery operations. This determination can be made based on a trigger, such as can be received by an authorized user or an automated method. If switchover is not triggered the method can proceed to 214 to log disaster recovery data, such as can include detected parameters results of calculations and disaster metrics and any response(s) received relating to preventing the switchover. From 214, the method can return to 204 to continue the monitoring operations and data. If the switchover is triggered, the method can proceed to 216 switchover operations to the cloud-based media resources that have been allocated. This can include mapping the allocated resources into the media supply chain for the subscribing media system. Corresponding disaster recovery data can also be logged into memory. Further charges can also be incurred by the subscribing media system based on the amount of time it operates in the disaster recovery mode.

Operations can remain in the disaster recovery mode until terminated and switched back over to the subscribing media system operations. The switch back can be performed in response to a user input (e.g., by an authorized user) or in response to automatically detecting that the disaster recovery condition no longer exists for the subscribing media system (e.g., via continued monitoring at 204). During the disaster recovery mode, metadata from the incoming real-time media asset can be extracted and a contingency media asset to replace an expected real-time media asset can be selected based on the extracted metadata.

In view of the foregoing, systems and methods have been disclosed to provide a virtualized disaster recovery service that can accommodate multiple subscribers concurrently. Additionally, since the likelihood of simultaneous geographically dispersed disasters is low, resources within the cloud can be thinly provisioned to different subscribers across the country. Such thin provisioning of resources can include more than available storage requirements, but also other hardware resources implemented in the media supply chain.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A disaster recovery system comprising:
    a plurality of resources arranged in a cloud computing environment, each of the plurality of resources being assignable to function within the cloud computing environment as one or more parts of a media supply chain configured to implement real-time broadcast operations of at least one media system;
    a content intake service programmed to control delivery of an incoming media asset to the cloud computing environment;
    a monitoring and recovery process programmed to monitor a primary media system corresponding to one of the at least one media systems of a subscribing media provider to which the incoming media asset is being provided;
    a disaster detector programmed to:
        compare at least one operating parameter of the primary media system of the subscribing media provider to a plurality of preprogrammed operating parameters corresponding to a disaster recovery condition indicating a failure of a resource in the primary media system, wherein the at least one operating parameter is defined by a subscription that controls a level and type of service provided by the disaster recovery system for the subscribing media provider; and
        determine, based upon the comparison, whether the disaster recovery condition has occurred for the primary media system; and
    wherein, in response to determining that a disaster recovery condition has occurred for the primary media system, the monitoring and recovery process is programmed to intelligently manage selected resources of the plurality of resources by mapping and allocating the selected resources of the plurality of resources based on the incoming media asset being delivered to the primary media system and the subscription of the subscribing media provider.

2. The system of claim 1, wherein the plurality of resources comprises:
    a cloud storage resource to store media for the at least one media system; and
    a media resource comprising at least two of an uplink, a downlink, a traffic and billing system, an ad insertion system, a digital asset management system, a media delivery system, a playout automation system, and a contingency media asset.

3. The system of claim 1, further comprising a switchover control programmed to connect the selected resources into real-time operations of the media supply chain of the primary media system in response to a trigger that is separate from the disaster recovery condition.

4. The system of claim 3, wherein the trigger comprises a user input provided by an authorized user.

5. The system of claim 1, further comprising:
    a rule selector to select rules based on a definition of the media asset; and
    a rules engine to control allocation and mapping of the plurality of resources for the disaster recovery condition based on the selected rules.

6. The system of claim 5, further comprising a metadata extractor to extract metadata from the incoming media asset being delivered to the primary media system, the definition of the media asset being generated based on the metadata.

7. The system of claim 5, wherein the incoming media asset being delivered to the primary media system corresponds to a live real-time media asset, the rule selector selecting the rules to facilitate retrieving contingency content based on the definition of the media asset if the live real-time media asset cannot be delivered during the disaster recovery condition.

8. The system of claim 7, wherein the contingency content comprises one of a different live media asset or a substitute media asset stored in a storage resource within the cloud computing environment.

9. The system of claim 5, wherein the media asset being delivered to the primary media system corresponds to a pre-recorded media asset, the rule selector selecting the rules to facilitate retrieving the pre-recorded media asset from memory, based on the definition of the media asset, to enable scheduled playout thereof during the disaster recovery condition.

10. The system of claim 1, wherein the content intake service further comprises a transcoder to transcode the incoming media asset to a corresponding disaster recovery asset having a reduced bit rate, wherein the amount of reduction of the reduced bit rate is based on the subscription of the subscribing media provider.

11. The system of claim 10, wherein the content intake service further comprises a rules engine that controls at least one of delivery or storage of the corresponding disaster recovery asset to the cloud computing environment based on metadata for the incoming media asset.

12. The system of claim 1, wherein the primary media system comprises a plurality of subscribing media systems, each having a respective subscription to the disaster recovery system, the plurality of resources in the cloud computing environment being thinly provisioned to service the plurality of subscribing primary media systems according to the respective subscriptions, such that in response to the monitoring and recovery process allocating selected resources of the plurality of resources to a given subscribing media system, the allocated selected resources become deterministic for disaster recovery operations for the given subscribing media system.

13. The system of claim 12, wherein an instance of the content intake service is provided for each of the plurality of subscribing media systems, at least some instances of the content intake service being programmed to modify media content of the incoming media assets.

14. The system of claim 1, wherein the monitoring and recovery process allocates at least one resource to replicate an automation and asset management function of the primary media system.

15. A method of providing a disaster recovery service for broadcast media providers, the method comprising:
  comparing at least one operating parameter associated with a primary media system of a respective media provider to a plurality of preprogrammed operating parameters corresponding to a disaster recovery condition indicating a failure of a resource in the primary media system of the respective media provider, wherein the at least one operating parameter is defined by a subscription that controls a level and type of service provided by the disaster recovery service for the respective media provider; and
  detecting a disaster recovery condition within a media supply chain of a respective media provider based on the subscription of the respective media provider;
  preparing and allocating selected resources of the plurality of resources in a cloud computing environment for switchover to corresponding operations in the media supply chain based on a definition of an incoming real-time media asset to the respective media provider and the subscription of the respective media provider; and
  in response to receiving a trigger, switching over the operations in the media supply chain of the respective media provider to the allocated resources in the cloud computing environment to provide deterministic disaster recovery media operations for the respective media provider.

16. The method of claim 15, wherein preparing and allocating further comprises:
  selecting rules based on the definition of the media asset; and
  controlling allocation and mapping of the resources for the disaster recovery condition based on the selected rules.

17. The method of claim 16, further comprising:
  extracting metadata from the incoming real-time media asset; and
  generating the definition of the media asset based on the extracted metadata.

18. The system of claim 16, wherein the incoming real-time media asset corresponds to a live media asset, the rules being selected to enable retrieving a related contingency media asset based on the definition of the media asset if the live media asset cannot be delivered during the disaster recovery condition.

19. The method of claim 15, further comprising:
  extracting metadata from the incoming real-time media asset to the respective media system; and
  selecting a contingency media asset based on the extracted metadata to replace an expected real-time media asset during the disaster recovery media operations.

20. The method of claim 15, further comprising delivering the real-time media asset to a cloud storage resource assigned to the respective media provider based on associated rules.

21. The method of claim 20, further comprising transcoding the real-time media asset to a reduced disaster recovery data rate such that media asset is stored in the cloud storage resource with the reduced disaster recovery data rate, wherein the amount of reduction of the reduced bit rate is based on the subscription of the respective media provider.

22. The method of claim 15, further comprising sending an alert notification in response to detecting the disaster recovery condition, wherein the trigger is received in response to a user input responsive to the alert notification and is separate from the disaster recovery condition.

23. The method of claim 15, further comprising allocating at least one media resource to replicate automation and asset management functions in the media supply chain of the respective media provider.

* * * * *